(12) United States Patent
Geng et al.

(10) Patent No.: US 11,351,546 B2
(45) Date of Patent: Jun. 7, 2022

(54) MICROFLUIDIC SUBSTRATE AND MANUFACTURING METHOD THEREOF, MICROFLUIDIC CHIP, AND CONTROL METHOD

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Yue Geng, Beijing (CN); Peizhi Cai, Beijing (CN); Fengchun Pang, Beijing (CN); Le Gu, Beijing (CN); Chuncheng Che, Beijing (CN); Hailin Xue, Beijing (CN); Xibin Shao, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 771 days.

(21) Appl. No.: 16/314,679

(22) PCT Filed: Jun. 8, 2018

(86) PCT No.: PCT/CN2018/090366
§ 371 (c)(1),
(2) Date: Jan. 1, 2019

(87) PCT Pub. No.: WO2019/041955
PCT Pub. Date: Mar. 7, 2019

(65) Prior Publication Data
US 2021/0346891 A1    Nov. 11, 2021

(30) Foreign Application Priority Data

Sep. 1, 2017  (CN) .......................... 201710780455.3

(51) Int. Cl.
*B01L 3/00*    (2006.01)

(52) U.S. Cl.
CPC ... *B01L 3/502792* (2013.01); *B01L 2200/027* (2013.01); *B01L 2200/12* (2013.01);
(Continued)

(58) Field of Classification Search
CPC ............. B01L 3/502792; B01L 3/5027; B01L 2200/027; B01L 2300/0645;
(Continued)

(56) References Cited

U.S. PATENT DOCUMENTS

| | | | |
|---|---|---|---|
| 2011/0268151 A1 | 11/2011 | Hadwen et al. | |
| 2012/0268804 A1 | 10/2012 | Hadwen | |

FOREIGN PATENT DOCUMENTS

| | | |
|---|---|---|
| CN | 205528801 U | 8/2016 |
| GB | 2533953 A | 7/2016 |
| WO | 2016111251 A1 | 7/2016 |

OTHER PUBLICATIONS

Supplemental European Search Report of European Application No. 18803523.2, dated May 10, 2021.
(Continued)

*Primary Examiner* — Brian J. Sines
(74) *Attorney, Agent, or Firm* — Syncoda LLC; Feng Ma

(57) ABSTRACT

A microfluidic chip and controlling method are provided. The microfluidic chip includes a microfluidic substrate, comprising a first substrate, a droplet driving assembly over the first substrate, and a temperature detection assembly. The droplet driving assembly includes a first electrode layer having a plurality of control electrodes, and each of the plurality of control electrodes is configured as part of a driving unit to drive a droplet to move along a predetermined path over the microfluidic substrate. The temperature detection assembly comprises at least one temperature sensor. The
(Continued)

at least one temperature sensor positionally corresponds to the plurality of control electrodes such that each of the at least one temperature sensor detects a temperature at a position associated with one of the plurality of control electrodes corresponding to the each of the at least one temperature sensor.

18 Claims, 16 Drawing Sheets

(52) U.S. Cl.
CPC . *B01L 2200/147* (2013.01); *B01L 2300/0645* (2013.01); *B01L 2300/165* (2013.01); *B01L 2300/1827* (2013.01); *B01L 2400/0415* (2013.01); *B01L 2400/082* (2013.01)

(58) Field of Classification Search
CPC ....... B01L 2300/165; B01L 2400/0415; B01L 2400/0427; B01L 2400/082
See application file for complete search history.

(56) References Cited

OTHER PUBLICATIONS

Indian Office Action of Indian Application No. 201837044782 dated May 3, 2021.
International Search Report and Written Opinion dated Sep. 13, 2018 in PCT/CN2018/090366.

MICROFLUIDIC SUBSTRATE AND MANUFACTURING METHOD THEREOF, MICROFLUIDIC CHIP, AND CONTROL METHOD

CROSS-REFERENCE TO RELATED APPLICATION

The present application claims priority to Chinese Patent Application No. CN 201710780455.3 filed on Sep. 1, 2017, the disclosures of which is hereby incorporated by reference in its entirety.

TECHNICAL FIELD

The present disclosure relates generally to the field of microfluidic technology, and more specifically to a microfluidic substrate and a manufacturing method thereof, a microfluidic chip and control method.

BACKGROUND

Microfluidic control is a fluidic control technology with independent liquid drops, or droplets, as control units. By accurately manipulating the movement of droplets, the technology can realize the fusion and separation of the droplets, and to complete various biochemical reactions.

According to a current microfluidic technology, a microfluidic chip typically drives a liquid (or more specifically, droplets) to move in a direction that is specified by applying a voltage on a control electrode on the microfluidic chip.

For some biochemical reactions that are sensitive to changes of temperature or require temperature control, the temperature of the biochemical reaction needs to be monitored. At present, existing temperature sensors, such as thermocouples, are typically attached directly onto an external surface of a microfluidic chip, so as to realize the monitoring of the environmental temperature of the biochemical reaction occurring on the microfluidic chip.

Because a conventional temperature sensor typically has a relatively large size, it can only detect the temperatures within a relatively large area on the microfluidic chip, whereas it is unable to accurately monitor the temperatures of droplets when they are moving on the microfluidic substrate.

SUMMARY

In order to address the issues of the current microfluidic technology, the present disclosure provides a microfluidic substrate, a microfluidic chip that contains the microfluidic substrate, and a method for controlling the microfluidic chip.

In a first aspect, a microfluidic substrate is provided.

The microfluidic substrate comprises a first substrate, a droplet driving assembly over the first substrate, and a temperature detection assembly. The droplet driving assembly includes a first electrode layer having a plurality of control electrodes, and each of the plurality of control electrodes is configured as part of a driving unit to drive a droplet to move along a predetermined path over the microfluidic substrate. The temperature detection assembly comprises at least one temperature sensor.

It is configured that the at least one temperature sensor positionally corresponds to the plurality of control electrodes such that each of the at least one temperature sensor detects a temperature at a position associated with one of the plurality of control electrodes corresponding to the each of the at least one temperature sensor.

According to some embodiments of the microfluidic substrate, an orthographic projection of each of the at least one temperature sensor on the first substrate at least partially overlaps with an orthographic projection of one of the plurality of control electrodes corresponding to the each of at least one temperature sensor on the first substrate.

Herein each of the at least one temperature sensor can comprise a PN junction and two electrodes, disposed over the first substrate, and the PN junction is disposed between the two electrodes.

According to some embodiments of the microfluidic substrate, the temperature detection assembly and the droplet driving assembly are respectively arranged over two opposing sides of the first substrate.

According to some other embodiments of the microfluidic substrate, the temperature detection assembly and the droplet driving assembly are arranged over a same side of the first substrate.

In the above embodiments of the microfluidic substrate where the temperature detection assembly and the droplet driving assembly are arranged over a same side of the first substrate, the temperature detection assembly can be arranged between the droplet driving assembly and the first substrate.

Furthermore, in the above embodiments of the microfluidic substrate, one of the two electrodes in the each of the at least one temperature sensor can form an integrated structure with the one of the plurality of control electrodes corresponding to the each of at least one temperature sensor.

Herein, the droplet driving assembly can further include a first dielectric layer and a first hydrophobic layer, which are sequentially disposed over the plurality of control electrodes.

Additionally, the one of the plurality of control electrodes corresponding to the each of at least one temperature sensor can comprise a portion whose orthographic projection on the first substrate is outside the orthographic projection of the each of the at least one temperature sensor on the first substrate. A via is arranged below the portion of the one of the plurality of control electrodes and above the first substrate, and is configured to allow an electric connection between the one of the plurality of control electrodes and a control lead line. Herein the control lead line can be arranged at a substantially same layer as another of the two electrodes of the each of the at least one temperature sensor.

According to some embodiments of the microfluidic substrate, the at least one temperature sensor positionally corresponds to the plurality of control electrodes in a one-to-one relationship.

According to some other embodiments of the microfluidic substrate, a number of the at least one temperature sensor is smaller than a number of the plurality of control electrodes.

In a second aspect, a microfluidic chip is disclosed. The microfluidic chip comprises an upper substrate and a microfluidic substrate. The upper substrate is provided with at least one reagent inlet, and the microfluidic substrate can be based on any one of the embodiments of the microfluidic substrate as described above. The upper substrate and the microfluidic substrate are attached to one another in a leak-proof manner to thereby allow the droplet to move therebetween According to some embodiments of the microfluidic chip, the upper substrate comprises a second substrate, a reference electrode, a second dielectric layer, and a second hydrophobic layer. The second hydrophobic layer, the second dielectric layer, the reference electrode, and the second substrate are sequentially disposed over a side of the first hydrophobic layer in the microfluidic substrate. The second hydrophobic layer and a first hydrophobic layer of the droplet driving assembly of the microfluidic substrate in the microfluidic substrate form a flowing space for the droplet.

In addition, the microfluidic chip can further include a variable resistor, which is electrically coupled to, and is configured to maintain a substantially constant current through, each of the at least one temperature sensor.

The microfluidic chip can further include a signal magnification circuit, which is electrically coupled to, and is configured to magnify a signal detected by each of the at least one temperature sensor.

In a third aspect, the disclosure further provides a method of controlling a microfluidic chip. The microfluidic chip includes an upper substrate and a microfluidic substrate. The microfluidic substrate comprises a droplet driving assembly comprising a plurality of control electrodes, and a temperature detection assembly comprising at least one temperature sensor. The at least one temperature sensor positionally corresponds to the plurality of control electrodes.

The method includes the following steps:

providing a first voltage signal to one of the plurality of control electrodes to drive the droplet to move along the predetermined path between the upper substrate and the microfluidic substrate; and providing a second voltage to one of the at least one temperature sensor to detect a temperature at a position associated with one of the plurality of control electrodes corresponding to the one of the at least one temperature sensor.

According to some embodiments, the method further includes:

stop providing the first voltage to any one of the plurality of control electrodes if the one of the at least one temperature sensor detects that a temperature at the position is not within a pre-determined range; and adjusting the temperature at the position until the one of the at least one temperature sensor detects that the temperature at the position is within the pre-determined range; and resuming providing the first voltage signal to the one of the plurality of control electrodes.

In the method, optionally, each of the first voltage signal and the second voltage signal can be a square waveform signal. Further optionally, the second voltage signal is configured to have a frequency no higher than a frequency of the first voltage signal.

BRIEF DESCRIPTION OF DRAWINGS

In order to clearly illustrate various embodiments in the invention disclosed herein, the following are accompanying drawings in the description of the embodiments, which are introduced briefly herein.

It is noted that these drawings shall be regarded to represent only some, but not all, of the embodiments of the present disclosure. For those skilled in the art, other embodiments may become apparent based on the structures as illustrated in these accompanying drawings.

DETAILED DESCRIPTION

Various embodiments of the present disclosure are described below with specific examples, and other advantages and effects of the present disclosure can be easily understood by those skilled in the field of technology from the contents disclosed in this specification.

Apparently, the described embodiments are only a part of embodiments in the present disclosure, rather than all of them. The present disclosure can also be implemented or applied through different specific embodiments, and various details of the specification can also be modified or changed based on different viewpoints and applications without departing from the spirit of the present disclosure.

Based on the embodiments in the present disclosure, all the other embodiments acquired by those skilled in the art on the premise of not paying creative labor are in the protection scope of the present disclosure. It should be noted that, on the premise that there is no conflict, the following embodiments and the features in the embodiments can be combined together.

In a first aspect, the present disclosure provides a microfluidic substrate.

The microfluidic substrate comprises a first substrate, a droplet driving assembly over the first substrate, and a temperature detection assembly. The droplet driving assembly includes a first electrode layer having a plurality of control electrodes, and each of the plurality of control electrodes is configured as part of a driving unit to drive a droplet to move along a predetermined path over the microfluidic substrate. The temperature detection assembly comprises at least one temperature sensor.

It is further configured that the at least one temperature sensor positionally corresponds to the plurality of control electrodes such that each of the at least one temperature sensor detects a temperature at a position associated with one of the plurality of control electrodes corresponding to the each of the at least one temperature sensor.

Herein the position can be a current position of the droplet when it is moving along the predetermined path over the microfluidic substrate, but can also be a position other than the current position of the droplet, for example, it can be a position the droplet is about to reach next. There are other possibilities as well.

Figure 1:
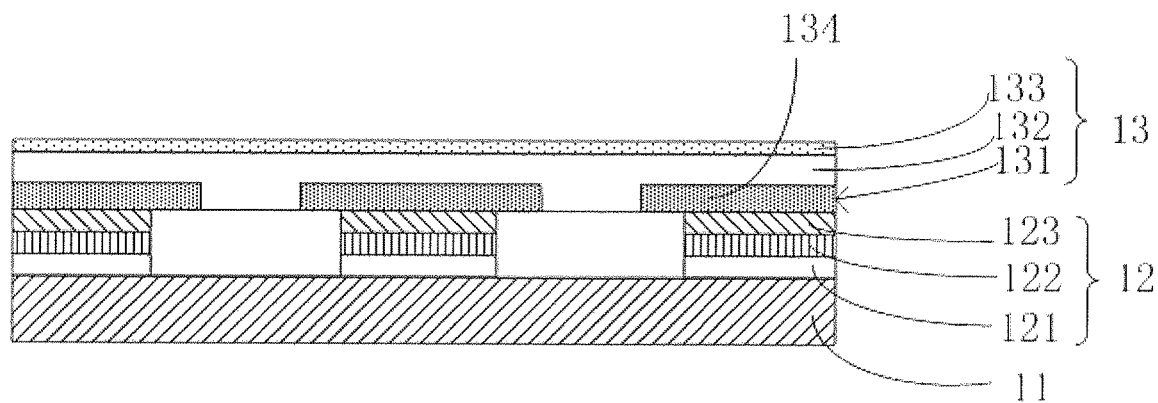
FIG. 1 is a schematic diagram illustrating a structure of a microfluidic substrate according to some embodiments of the present disclosure.

FIG. 1 is a schematic diagram illustrating a structure of a microfluidic substrate according to some embodiments of the present disclosure. As shown in the figure, the microfluidic substrate comprises a first substrate 11, a droplet driving assembly 13 and a temperature detection assembly 12. The temperature detection assembly 12 and the droplet driving assembly 13 are disposed sequentially over the first substrate 11.

The droplet driving assembly 13 comprises a first electrode layer 131, a first dielectric layer 132 and a first hydrophobic layer 133, which are sequentially disposed over the first substrate 11. The first electrode layer 131 comprises a plurality of control electrodes 134.

The temperature detection assembly 12 comprises a plurality of temperature sensors, which are substantially temperature detection units (i.e. temperature sensor) for the microfluidic substrate in the microfluidic chip.

The plurality of temperature sensors are aligned in a plane parallel with the first substrate 11, and are configured to correspond to the plurality of control electrodes 134 in a one-to-one relationship. Each corresponding pair of a temperature sensor and a control electrode 134 are arranged to overlap with one another in a direction perpendicular to the first substrate 11 (i.e. an orthographic projection of a temperature sensor on the substrate is overlapped with and an orthographic projection of a control electrode 134 corresponding to the temperature sensor on the first substrate 11).

In the embodiments of the microfluidic substrate as described herein, a temperature detection assembly 12 comprising a plurality of temperature sensors is integrated into the microfluidic substrate, and the plurality of temperature sensors and the plurality of control electrodes 134 in a droplet driving assembly 13 are configured to correspond to one another in a one-to-one relationship. Such a configuration ensures that a control electrode and a corresponding temperature sensor are precisely matched, which is beneficial to the precise monitoring of the temperature of a droplet moving along a predetermined path on the microfluidic substrate in the microfluidic chip.

In the microfluidic substrate disclosed herein, the first substrate 11 can have a composition of a glass, a silicon, a quartz, a polymer (such as polydimethylsiloxane, or PDMS), or a material of other types. The first electrode layer 131 can have a composition of a metal such as Al, Cu, Mo, Ti, Cr, etc., an alloy of any two of these above metals, or a transparent conductive material, such as a thin film of indium tin oxide (ITO), or indium zinc oxide (IZO), etc. The first dielectric layer 132 can comprise silicon oxide, silicon nitride, PDMS, parylene, etc. The first hydrophobic layer 133 can comprise PTFE, fluorine plastic, PMMA, or an organic polymer, etc.

In the temperature detection assembly 12, each temperature sensor (i.e. temperature sensor) includes a ground electrode 121 and a PN junction consisting of an N-type layer 122 and a P-type layer 123. The ground electrode 121 is over the first substrate 11, and the PN junction is over the ground electrode 121. As such, the PN junction of each temperature sensor is substantially arranged between the ground electrode 121 and a corresponding control electrode 134.

In the above embodiments of the microfluidic substrate shown in FIG. 1, in each temperature sensor of the temperature detection assembly 12, by arranging a PN junction between a ground electrode 121 and a control electrode 134 corresponding to the ground electrode 121, the control electrode 134 in the first electrode layer 131 of the droplet driving assembly 13 can thus be configured both as an electrode for the droplet driving assembly 13 and as an electrode for each temperature sensor in the temperature detection assembly 12. As such, the structure of the microfluidic substrate can be simplified, the manufacturing cost can be reduced, and the thickness of the microfluidic substrate can also be reduced as well.

Similar to the first electrode layer 131 in the droplet driving assembly 13, the ground electrode 121 in each temperature sensor of the temperature detection assembly 12 can comprise a metal such as Al, Cu, Mo, Ti, Cr, etc., an alloy of any two of these above metals, or a transparent conductive material, such as a thin film of indium tin oxide (ITO) or indium zinc oxide (IZO), etc. The N-type layer 122 can be formed by doping phosphorus in an amorphous silicon, and the P-type layer 123 can be formed by doping boron in an amorphous silicon.

As such, each temperature sensor in the temperature detection assembly 12 can be directly integrated on the first substrate 11 by means of a fabrication process using semiconductor materials, which is relatively easy and simple, and incurs a relatively low manufacturing cost.

In the aforementioned embodiments of the microfluidic substrate as illustrated in FIG. 1, the temperature detection assembly 12 and the droplet driving assembly 13 are arranged sequentially over a same side of the first substrate 11. It is noted, however, that there is actually no limitation to the relative positions of the temperature detection assembly 12 and the droplet driving assembly 13 in a microfluidic substrate. The temperature detection assembly 12 and the droplet driving assembly 13 can be, for example, arranged over two opposing sides of a first substrate 11.

In the embodiments of the microfluidic substrate shown in FIG. 1, the plurality of temperature sensors in the temperature detection assembly 12 and the plurality of control electrodes 134 in a droplet driving assembly 13 are configured to correspond to one another in a one-to-one relationship.

It is noted that other corresponding relationships are also possible. In one embodiment, a number of the plurality of temperature sensors can be configured to be smaller than a number of the plurality of control electrodes 134 in a droplet driving assembly 13. For example, it can be configured that the plurality of control electrodes 134 are twice the number of the plurality of temperature sensors, and as such, one temperature sensor can be arranged under, and configured to positionally correspond to, every other control electrode 134.

Figure 2:
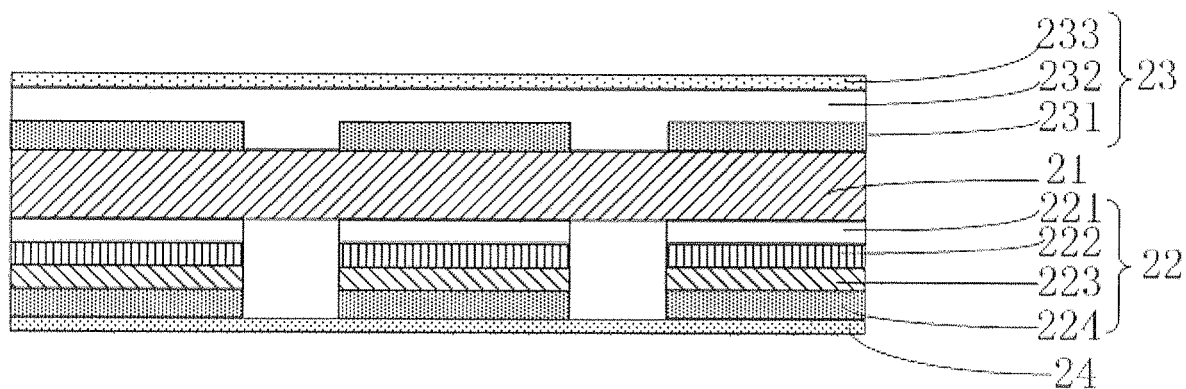
FIG. 2 is a schematic diagram illustrating a structure of a microfluidic substrate according to some other embodiments of the present disclosure.

FIG. 2 illustrates a microfluidic substrate according to some other embodiments of the present disclosure. In the embodiments of the microfluidic substrate as shown in FIG. 2, a temperature detection assembly 22 and a droplet driving assembly 23 are substantially arranged on two opposing sides of a first substrate 21.

Further as shown in FIG. 2, similar to the embodiments of the microfluidic substrate as shown in FIG. 1, the droplet driving assembly 23 in the embodiments of the microfluidic substrate as illustrated in FIG. 2 also comprises a first electrode layer 231, a first dielectric layer 232 and a first hydrophobic layer 233, which are sequentially arranged over the first substrate 21. The droplet driving assembly 23 in the embodiments of the microfluidic substrate illustrated in FIG. 2 has a substantially same structure and same composition as the droplet driving assembly 13 in the aforementioned embodiments of the microfluidic substrate as illustrated in FIG. 1, and the description thereof is skipped herein.

Further as shown in FIG. 2, the temperature detection assembly 22 in the embodiments of the microfluidic substrate illustrated in FIG. 2 is arranged over a side of the first substrate 21 opposing to (i.e. distal to) the droplet driving assembly 23. Similar to the embodiments as shown in FIG. 1, the temperature detection assembly 22 also comprises a plurality of temperature sensors, and each temperature sensor comprises a ground electrode 221, a PN junction consisting of an N-type layer 222 and a P-type layer 223, and a driving electrode 224, which are arranged in an increasing distance to the first substrate 21.

The driving electrode 224 can comprise a metal such as Al, Cu, Mo, Ti, Cr, etc., an alloy of any two of these above metals, or a transparent conductive material, such as a thin film of indium tin oxide (ITO) or indium zinc oxide (IZO), etc. Compositions that can be employed in the ground electrode 221 and the PN junction can be referenced to the ground electrode 121 and PN junction in the embodiments of the microfluidic substrate as illustrated in FIG. 1, and the detailed descriptions thereof are skipped herein.

The embodiments of the microfluidic substrate as illustrated in FIG. 2 further comprises a protective layer 24 disposed on a side of the driving electrode 224 distal to the first substrate 21, which can be, for example, a packaging structure of resin or a protective cover plate. As such, the temperature detection assembly 22 is substantially disposed between the protective layer 24 and the first substrate 21.

Compared with the embodiments of the microfluidic substrate as shown in FIG. 2, the embodiments of the microfluidic substrate as shown in FIG. 1 do not require arranging a driving electrode 224 and the protection layer 24 for each temperature sensor in the temperature detection assembly 22. As such, the embodiments of the microfluidic substrate illustrated in FIG. 1 has a smaller thickness and a simpler layered structure compared with the embodiments of the microfluidic substrate illustrated in FIG. 2, and the manufacturing process is simpler.

In the embodiments of the microfluidic substrate as illustrated in FIG. 1, an orthographic projection of each temperature sensor on the first substrate 11 is within an orthographic projection of a control electrode 134 corresponding to the each temperature sensor on the first substrate 11.

It is further configured the area of the orthographic projection of each temperature sensor on the first substrate 11 is smaller than the area of the orthographic projection of the corresponding control electrode 134 on the first substrate 11. In the cross-section view of the microfluidic substrate illustrated in FIG. 1, there is a portion of a corresponding control electrode 134 that extends out of each temperature sensor (i.e. an orthographic projection of the portion of the corresponding control electrode 134 on the first substrate 11 is outside of an orthographic projection of the each temperature sensor 12 on the first substrate 11).

It can be further configured such that a via is arranged below the aforementioned portion of the corresponding control electrode 134 (i.e. the extended portion). The via is utilized to electrically connect the control electrode 134 with a control lead line. This feature facilitates an overall wiring of a microfluidic chip containing the embodiments of the microfluidic substrate illustrated in FIG. 1.

Moreover, this above feature also ensures that a control lead line does not take up a space between two adjacent control electrodes 134, which thereby allows a distance between any two adjacent control electrodes to be as small as possible, in turn facilitating a control of the movement directions of droplets.

It is noted that an orthographic projection of each temperature sensor on the substrate can be configured to match with (precisely overlap with) an orthographic projection of a control electrode corresponding to the each temperature sensor on the substrate, as illustrated by the embodiments of the microfluidic substrate shown in FIG. 2.

Figure 3A:
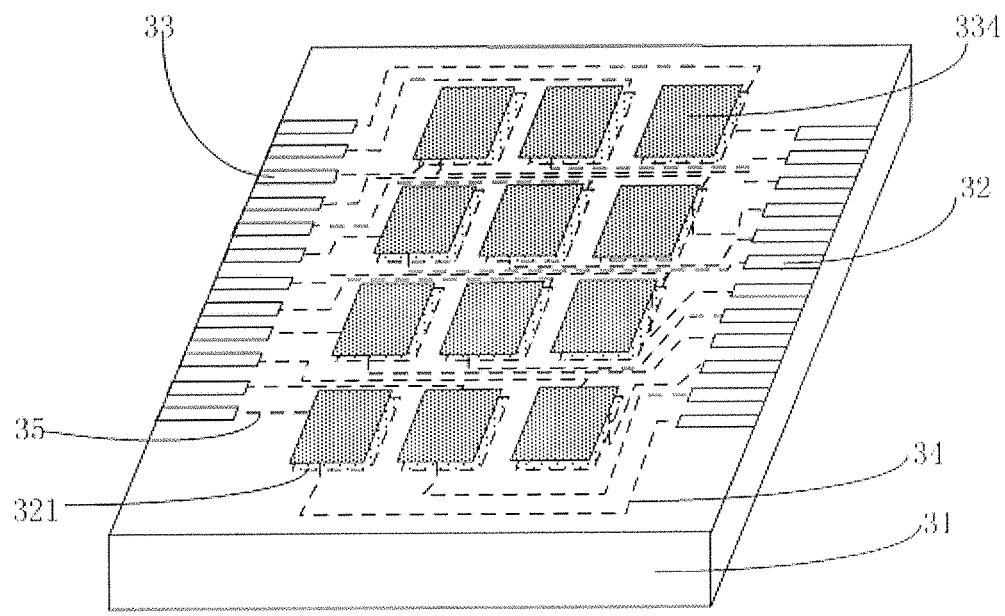
FIG. 3A is a schematic diagram of a wiring of the microfluidic substrate illustrating an arrangement for the control electrodes according to one embodiment of the present disclosure.

FIG. 3A is a schematic diagram illustrating the wiring of a microfluidic substrate according to one embodiment of the present disclosure. As shown in FIG. 3A, the microfluidic substrate comprises a first substrate 31, a plurality of ground electrodes 321, and a plurality of control electrodes 334. The plurality of ground electrodes 321 and the plurality of control electrodes 334 are disposed over the first substrate 31. It is noted that the temperature detection assembly and the other structures of the droplet driving assembly are omitted in the figure in order to simplify the explanation.

As illustrated in FIG. 3A, this embodiment of the microfluidic substrate also includes a plurality of control pins 32 and a plurality of temperature pins 33, each configured for loading voltage signals thereto. The plurality of control pins 32 and the plurality of temperature pins 33 are respectively arranged on two opposing lateral sides of the first substrate 31 (as illustrated in FIG. 3A, the plurality of control pins 32 are disposed on a right side of the first substrate 31, and the plurality of temperature pins 33 are disposed on a left side of the first substrate 31).

Each of the plurality of control pins 32 is electrically coupled or connected to a control electrode 334 by means of a control lead line 34, and each of the plurality of temperature pins 33 is electrically connected to a ground electrode 321 by means of a temperature lead line 35 to in turn electrically couple with a temperature sensor corresponding thereto.

Such a configuration can allow the temperature lead lines and the control lead lines to be able to distribute in a spreading manner, thereby facilitating the wiring for the microfluidic substrate.

Figure 3B:
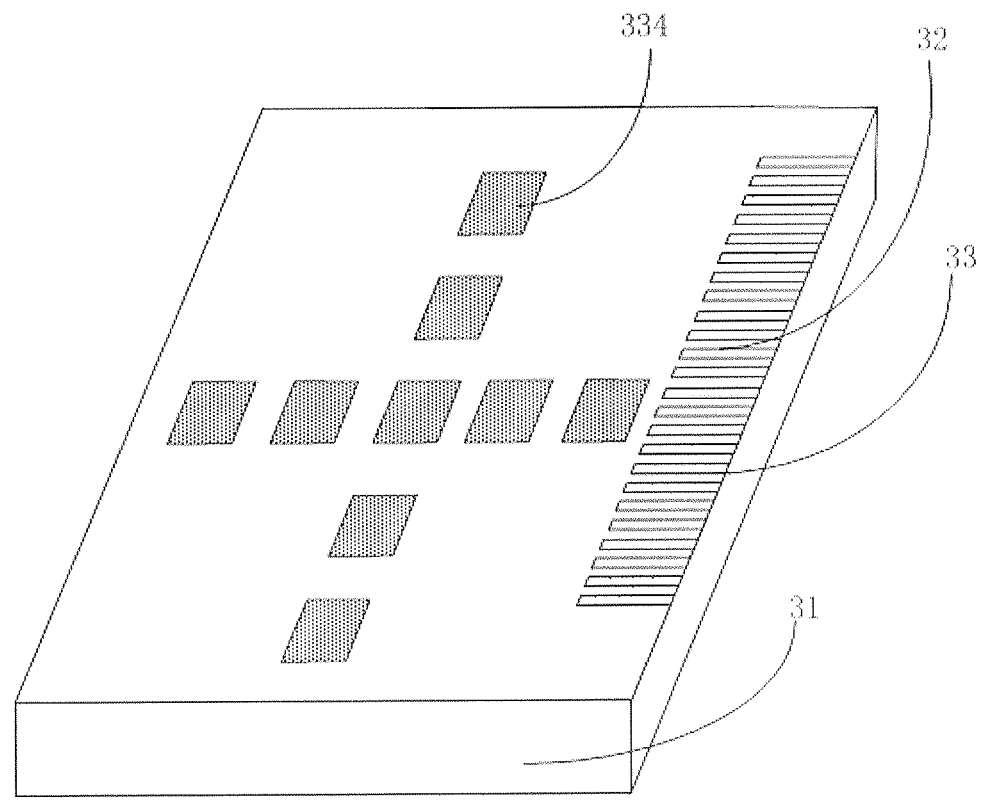
FIG. 3B is a schematic diagram illustrating an arrangement for the control electrodes according to another embodiment of the present disclosure.
Figure 3C:
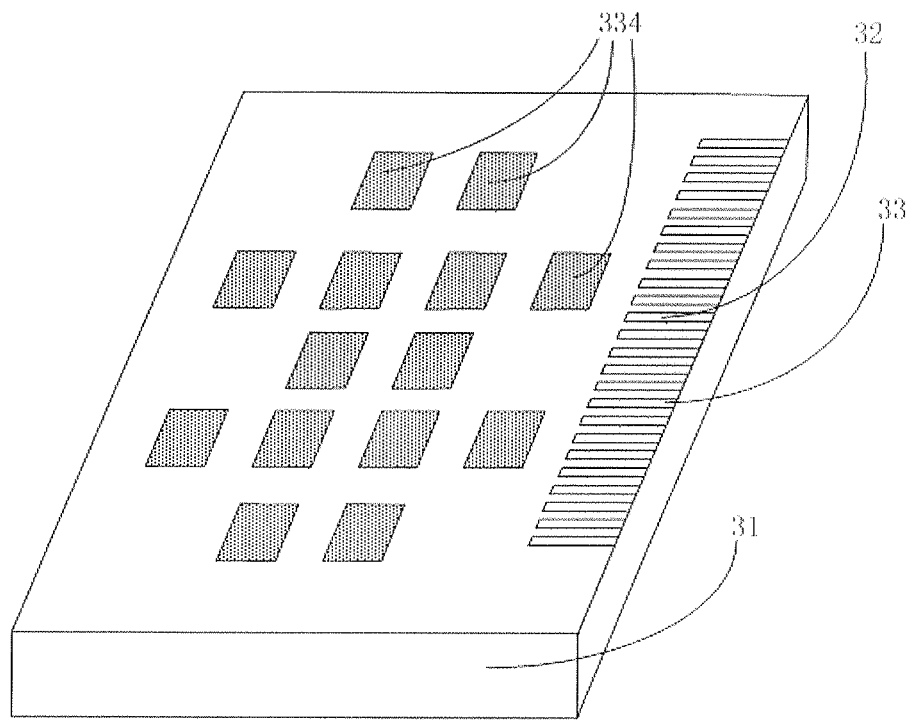
FIG. 3C is a schematic diagram illustrating an arrangement for the control electrodes according to yet another embodiment of the present disclosure.
Figure 3D:
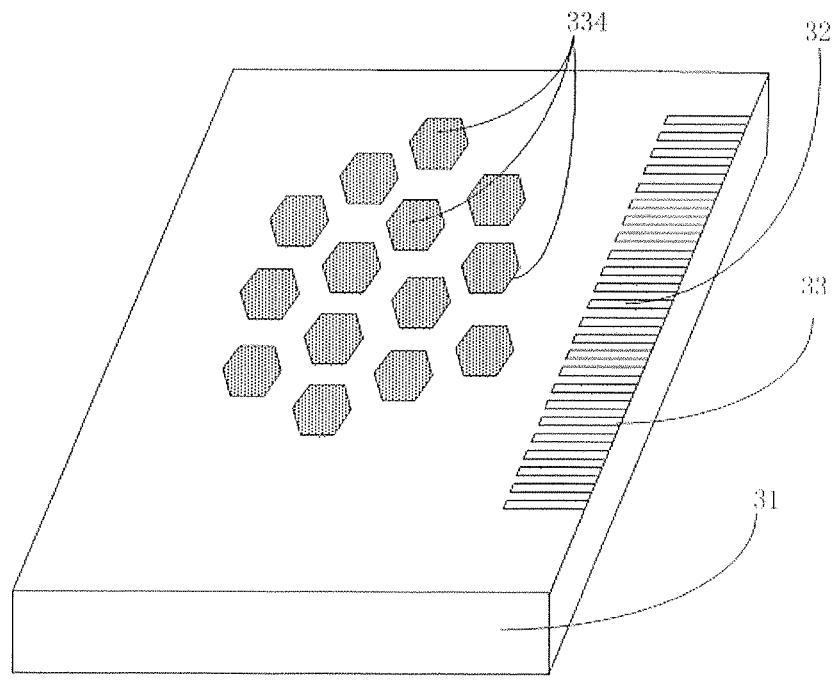
FIG. 3D is a schematic diagram illustrating an arrangement for the control electrodes according to yet another embodiment of the present disclosure.

According to some other embodiments of the disclosure, the plurality of control pins 32 and the plurality of temperature pins 33 can be arranged on two adjacent sides of the first substrate 31 (i.e. two sides that form a corner of the first substrate 31, which is not shown in the drawings), or on a same side of the first substrate 31 (as illustrated by the three other embodiments shown in FIG. 3B, FIG. 3C, or FIG. 3D).

Herein, each control lead line 34 and its corresponding control electrode 334 (i.e. the control electrode 334 electrically connected with the each control lead line 34) can be arranged at two different layers over the first substrate 31, which are electrically connected by means of one or more vias disposed to positionally connect the two different layers.

Figure 4:
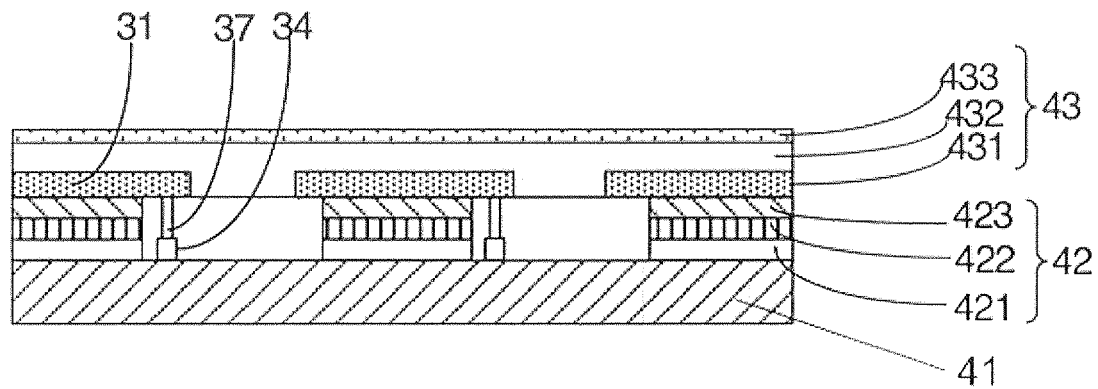
FIG. 4 is a schematic diagram illustrating a structure of a microfluidic substrate according to yet some other embodiments of the present disclosure.

FIG. 4 illustrates a structure of a microfluidic substrate according to yet some other embodiments of the present disclosure. As shown in FIG. 4, the embodiments of microfluidic substrate illustrated in FIG. 4 includes a first substrate 41, a temperature detection assembly 42, and a droplet driving assembly 43. The temperature detection assembly 42 and the droplet driving assembly 43 are disposed sequentially over the first substrate 41.

Further as shown in FIG. 4, the temperature detection assembly 42 also comprises a plurality of temperature sensors, each comprising a ground electrode 421, a PN junction consisting of an N-type layer 422 and a P-type layer 423. The droplet driving assembly 43 comprises a first electrode layer 431, a first dielectric layer 432 and a first hydrophobic layer 433, which are sequentially disposed over the first substrate 41. The composition and other relevant descriptions of each of the temperature detection assembly 42 and the droplet driving assembly 43 can reference to the aforementioned embodiments of the microfluidic substrate as illustrated in FIG. 1.

In the embodiments of the microfluidic substrate as illustrated in FIG. 4, the first electrode layer 431 comprises a plurality of control electrodes 334, and each of the plurality of control electrodes 334 is electrically coupled or connected to a control lead line 34 through a via 37. The control lead line 34 is arranged at a substantially same layer as the ground electrode 421. In a direction perpendicular to the first substrate 41, a via 37 is arranged below each of the plurality of control electrodes 334 (i.e. on a surface of the each of the plurality of control electrodes 334 proximate to the first substrate 41) and over a lateral side of the temperature sensor 42.

By configuring that each control lead lines 34 is arranged at a substantially same layer as a ground electrode 421 corresponding thereto, the plurality of control lead lines 34 and the plurality of ground electrode 421 can be formed together (i.e. at the same time) by a single one-time patterning process, thereby resulting in a simplified manufacturing process.

Optionally, in a similar manner, the aforementioned control pins 32 and temperature pins 33 can also be arranged at a substantially same layer as the ground electrode 421 to further simplify the fabrication process.

It is noted that in addition to the embodiments as described above, it can be configured such that some control lead lines may be arranged at a substantially same layer as the control electrodes, whereas other control lead lines may be arranged at a different layer as the control electrode. For example, a control lead line which is surrounded by other control electrode(s) can be arranged at a different layer as the control electrode corresponding thereto, whereas a control lead line that is not surrounded by other control electrode(s) can be arranged at a substantially same layer as the control electrode corresponding thereto. These above arrangements can avoid the area between adjacent control electrodes from being taking up by the control lead lines.

Alternatively, it can be configured such that all control lead lines are arranged at a substantially same layer as the control electrodes. This arrangement is suitable to the cases where no control lead line is surrounded by other control electrode(s), as illustrated in FIG. 3B.

In the illustrating embodiment as illustrated in FIG. 3A, the plurality of control electrodes 334 are arranged in a matrix having rows and columns, but it is noted that the arrangement for the plurality of control electrodes 334 is not limited to this embodiment, and can be designed differently based on practical needs. For example, the plurality of control electrodes can be arranged, but are not limited to, as straight line(s), as cross(es), or as grid(s).

For example, FIG. 3B illustrating an embodiment where the plurality of control electrodes are arranged as a cross. FIG. 3C illustrating another embodiment where the plurality of control electrodes are arranged as a grid having two parallel rows and two parallel columns crossing to one another.

In the illustrating embodiment as illustrated in FIG. 3A, each of the plurality of control electrodes 334 has a rectangular shape, but it is noted that the shape of each control electrode can be designed differently based on practical needs, which can be, but is not limited to, a polygon or an irregular shape. FIG. 3D illustrating an embodiment where each of the plurality of control electrodes has a shape of a hexagon.

It is further noted that FIGS. 3B-3D only illustrate the various arrangements for the plurality of control electrodes, and omit the wirings. The number of the control electrodes shown in FIGS. 3A-3D is only for illustrating purpose only, and does not impose a limitation to the scope of the disclosure.

During implementation, a distance between adjacent control electrodes can be configured to be about 50-500 µm, and preferably to be about 50-200 µm. This distance can ensure the precision for driving the droplets.

Each control electrode can have a size of about 500 µm-3 mm. Herein the size of a control electrode is defined as a diameter of a circumcircle for the contour shape of the control electrode, i.e. a maximum distance between two points on the contour shape of the control electrode. For example, if the control electrode has a shape of a rectangle, the size of the control electrode is substantially a length of a diagonal line of the rectangle.

In a second aspect, the disclosure further provides a microfluidic chip, which comprises a microfluidic substrate according to any one of the embodiments as described above.

Figure 5:
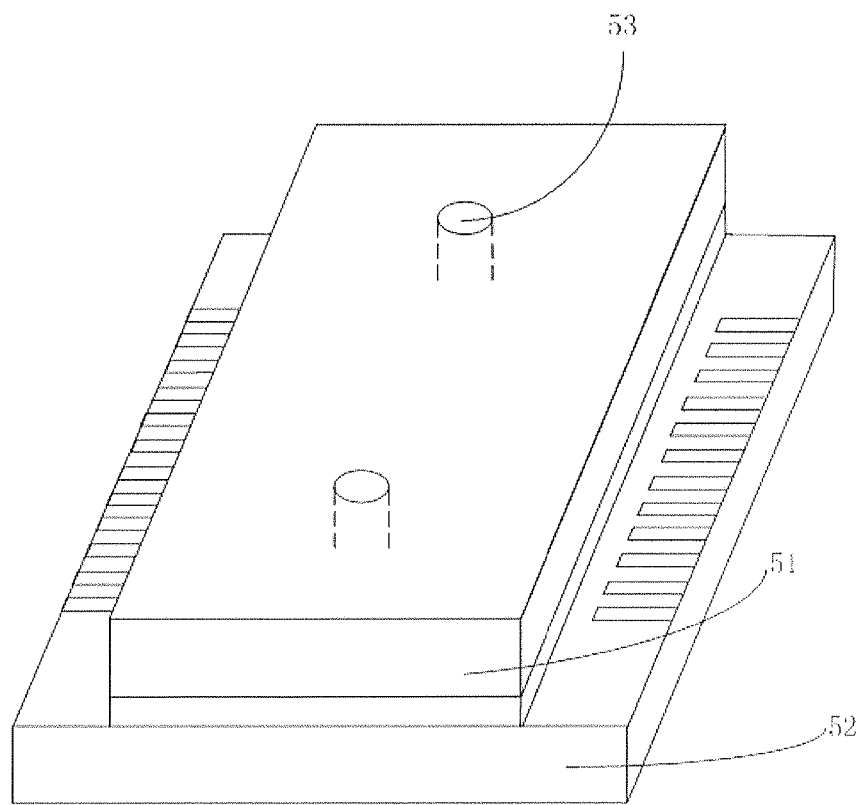
FIG. 5 is a schematic diagram of a structure of a microfluidic chip according to some embodiments of the disclosure.

Specifically, FIG. 5 illustrates a structure of a microfluidic chip according to some embodiments of the disclosure. As shown in FIG. 5, the microfluidic chip comprises an upper substrate 51 and a microfluidic substrate 52, which are aligned in parallel and are attached to each other in a leak-proof manner. The upper substrate 51 is provided with at least one reagent inlet 53.

Figure 6A:
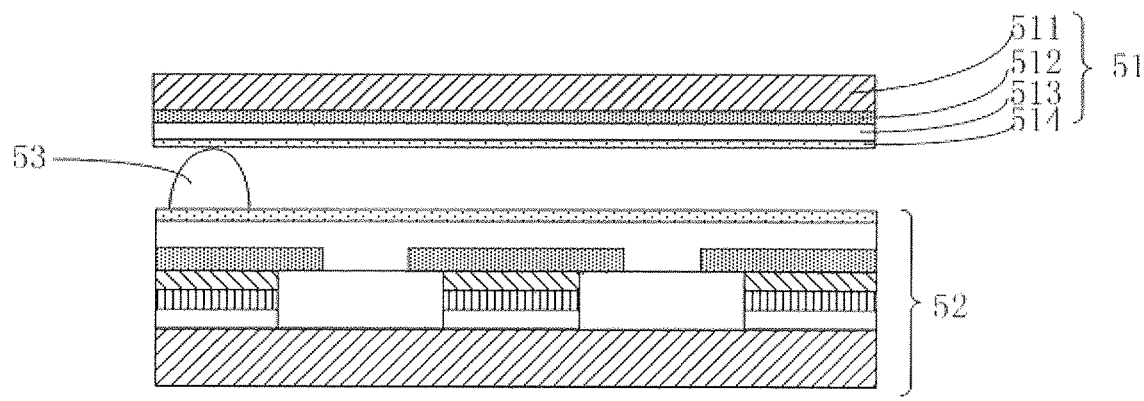
FIG. 6A is a cross-section view of a microfluidic chip according to some embodiments of the present disclosure.

FIG. 6A is a cross-section view of a microfluidic chip according to some embodiments of the present disclosure. In the microfluidic chip as illustrated in FIG. 6A, the upper substrate 51 comprises a second substrate 511 and a reference electrode 512, a second dielectric layer 513, and a second hydrophobic layer 514. The reference electrode 512, the second dielectric layer 513, and the second hydrophobic layer 514 are sequentially disposed over one side of the first second substrate 511 (as shown in a direction downward from the second substrate 511 in FIG. 6A).

The space between the upper substrate 51 and the microfluidic substrate 52 is configured as a flowing space of a liquid droplet 53. The microfluidic substrate 52 of the microfluidic chip substantially comprises a microfluidic substrate as illustrated in FIG. 1, whose description can reference to the various embodiments as described above, and will not be repeated herein. It is noted that besides the embodiment as shown in FIG. 6A, the microfluidic substrate of a microfluidic chip can also comprise a microfluidic substrate according to embodiments other than the embodiments as illustrated in FIG. 1.

In order to realize a leak-proof attachment between the upper substrate 51 and the microfluidic substrate 52 for the microfluidic chip, the upper substrate 51 and the microfluidic substrate 52 can be attached to each other by means of a sealant.

The second substrate 511 of the upper substrate 51 can comprise a transparent material such as glass, monocrystalline silicon, quartz, high molecular-weight polymer, such as PDMS, etc. The reference electrode 512 can comprise a transparent conductive material, such as ITO or IZO, etc. The second dielectric layer 513 can comprise silicon oxide, silicon nitride, poly (two methyl siloxane) and other materials. The second hydrophobic layer 514 can comprise polytetrafluoroethylene, fluoroplastic, polymethyl methacrylate, or an organic polymer, etc.

Because of the needs to observe the movement of droplets from a top side of the upper substrate 51, the upper substrate 51 is configured to be transparent.

In the microfluidic chip, the plurality of control electrodes in the microfluidic substrate and the reference electrode in the upper substrate substantially form a plurality of driving units, configured to drive a droplet to move at each position along a predetermined path between the upper substrate and the microfluidic substrate. The at least one temperature sensor in the microfluidic substrate is configured to positionally correspond to the plurality of driving units. Each of the at least one temperature sensor can detects a temperature of the droplet when the droplet is moving at each position.

Optionally, the microfluidic chip can further comprise a temperature adjusting module, which can adjust the temperature at any position in the microfluidic chip to ensure that the temperature is within a predetermined range, such as between 69.0-71.0° C., before the droplet arrives.

Optionally, the microfluidic chip further comprises a plurality of signal magnification circuits, each coupled to each temperature sensor of the temperature detection assembly in the microfluidic substrate, and configured to magnify the temperature detection signal obtained by each temperature sensor.

According to some embodiments, each signal magnification circuit is configured to magnify the voltage signal (Vtemp) outputted by each corresponding temperature sensor and to further output a magnified voltage signal (Vout). Each signal magnification circuit can optionally include at least one signal magnification sub-circuit, and the at least one signal magnification unit can be electrically coupled in series to realize a level-by-level magnification of the voltage signal.

Figure 6B:
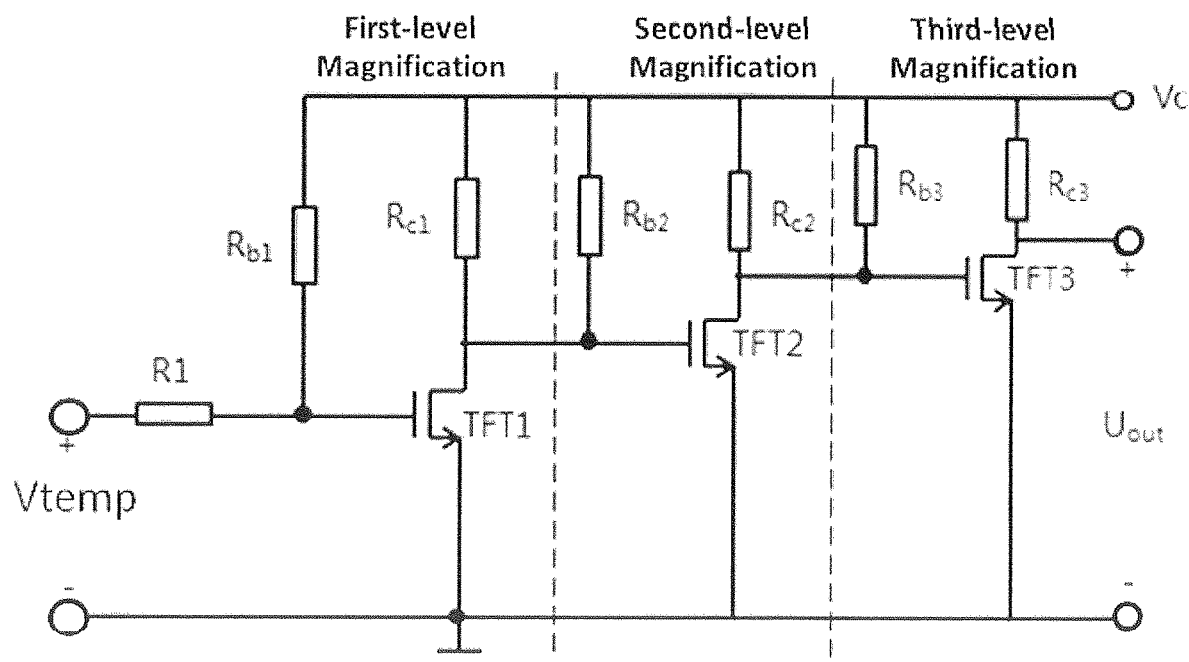
FIG. 6B is a circuit diagram of a signal magnification circuit for magnifying the voltage signal (Vtemp) outputted by each corresponding temperature sensor in the microfluidic chip according to some specific embodiment of the disclosure

FIG. 6B illustrates a circuit diagram of a signal magnification circuit for magnifying the voltage signal (Vtemp) outputted by each corresponding temperature sensor in the microfluidic chip according to some specific embodiment of the disclosure. Here the signal magnification circuit is substantially a three-level signal magnification circuit comprising a first-level signal magnification sub-circuit, a second-level signal magnification sub-circuit, and a third-level signal magnification sub-circuit, which are substantially connected in series to realize a level-by-level magnification of the voltage signal (Vtemp). The signal magnification circuit illustrated in FIG. 6B can realize a three-fold magnification of the original voltage signal (Vtemp) in the outputted voltage signal.

It is noted that the signal magnification circuit illustrated in FIG. 6B is only an illustrating example. An n level of the signal magnification sub-circuits can be included in each signal magnification circuit to thereby realize an n-fold magnification of the original voltage signal (Vtemp). Herein n can be any integer.

In the microfluidic chip disclosed herein, the microfluidic chip comprises a microfluidic substrate according to any one the embodiments as described above. A temperature detection assembly is integrated into a substrate of the microfluidic substrate (i.e. the first substrate), and a temperature sensor and a control electrode are configured to correspond to one another in a one-to-one relationship. Such a configuration ensures that a control electrode and a corresponding temperature sensor are precisely matched in position, which is beneficial to the precise monitoring of the temperature of droplets moving on the microfluidic substrate in the microfluidic chip.

In a third aspect, the disclosure further provides a method for manufacturing a microfluidic substrate. Such a method can be utilized for manufacturing the microfluidic substrate based on any of the embodiments as described above.

Figure 7:
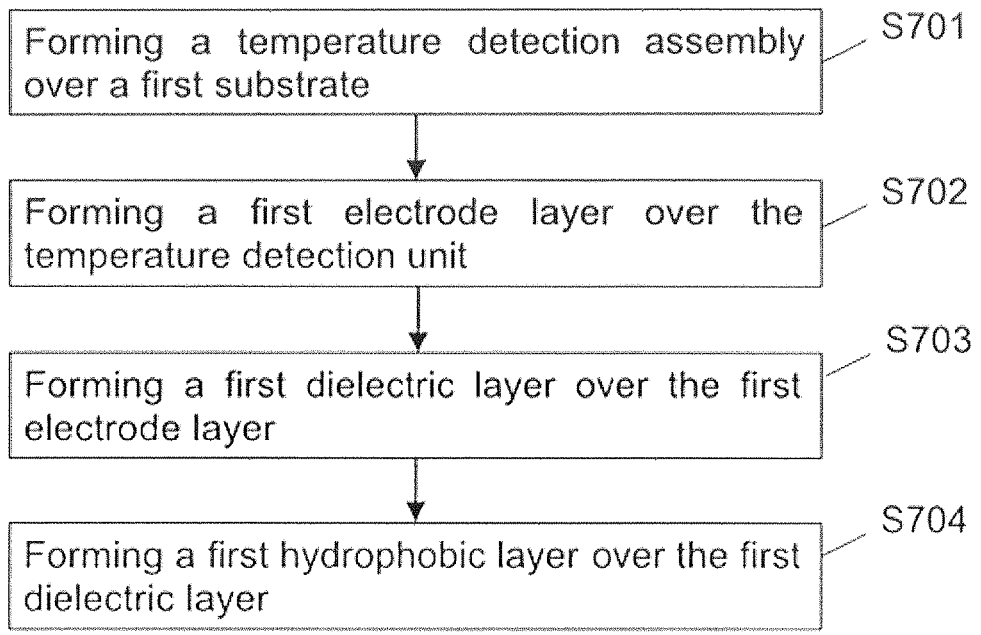
FIG. 7 illustrates a flow chart of a method for manufacturing a microfluidic substrate according to some embodiments of the disclosure.

FIG. 7 illustrates a flow chart of a method for manufacturing a microfluidic substrate according to some embodiments of the disclosure. The method can be utilized to manufacture the microfluidic substrate according to the embodiments as illustrated in FIG. 1

As shown in FIG. 7, the method substantially comprises the following steps, which are as respectively set forth in S701-S704:

S701: Forming a temperature detection assembly over a first substrate, wherein the temperature detection assembly comprises a plurality of temperature sensors;

S702: Forming a first electrode layer over the temperature detection assembly, wherein the first electrode layer comprises a plurality of control electrodes, the plurality of temperature sensors are configured to positionally correspond to the plurality of control electrodes in a one-to-one relationship, and each corresponding pair of a temperature sensor and a control electrode are arranged to overlap with one another in a direction perpendicular to the first substrate (i.e. an orthographic projection of a temperature sensor on the first substrate is overlapped with and an orthographic projection of a control electrode corresponding to the temperature sensor on the first substrate).

S703: Forming a first dielectric layer over the first electrode layer; and

S704: Forming a first hydrophobic layer over the first dielectric layer.

Herein by utilizing the manufacturing method as described above, a temperature detection assembly can be integrated into a substrate (i.e. the first substrate) of the microfluidic substrate, and a temperature sensor and a control electrode are configured to positionally correspond to one another in a one-to-one relationship. Such a configuration ensures that a control electrode and a corresponding temperature sensor are precisely matched, which is beneficial to the precise monitoring of the temperature of droplets moving on the microfluidic substrate in a microfluidic chip.

Figure 8:
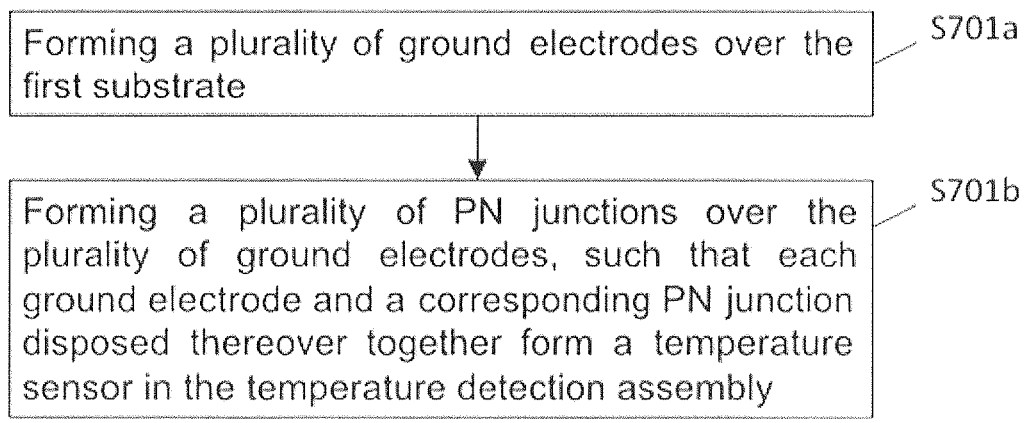
FIG. 8 illustrates a flow chart of the step of forming a temperature detection assembly over a substrate in the method for manufacturing a microfluidic substrate as illustrated in FIG. 7 according to some embodiments of the disclosure.

FIG. 8 illustrates a flow chart of the step of forming a temperature detection assembly over a first substrate (i.e. S701) in the method for manufacturing a microfluidic substrate as illustrated in FIG. 7 according to some embodiments of the disclosure.

As shown in the FIG. 8, the step of forming a temperature detection assembly over a first substrate (i.e. S701) comprises:

S701a: Forming a plurality of ground electrodes over the first substrate;

S701b: Forming a plurality of PN junctions over the plurality of ground electrodes, such that each ground electrode and a corresponding PN junction disposed thereover together form a temperature sensor in the temperature detection assembly.

Herein by means of the step as shown in FIG. 8 and of the method as shown in FIG. 7, a microfluidic substrate having a structure as illustrated in FIG. 1 can be manufactured.

In the microfluidic substrate manufactured thereby, in each temperature sensor of a temperature detection assembly, a PN junction is arranged between a ground electrode and a control electrode corresponding to the ground electrode, and thus each control electrode in the first electrode layer can thus be configured both as an electrode for the droplet driving assembly and as an electrode for each temperature sensor in the temperature detection assembly. As such, the structure of the microfluidic substrate can be simplified, a manufacturing cost can be reduced, and the thickness of the microfluidic substrate can also be reduced.

Figure 9A:
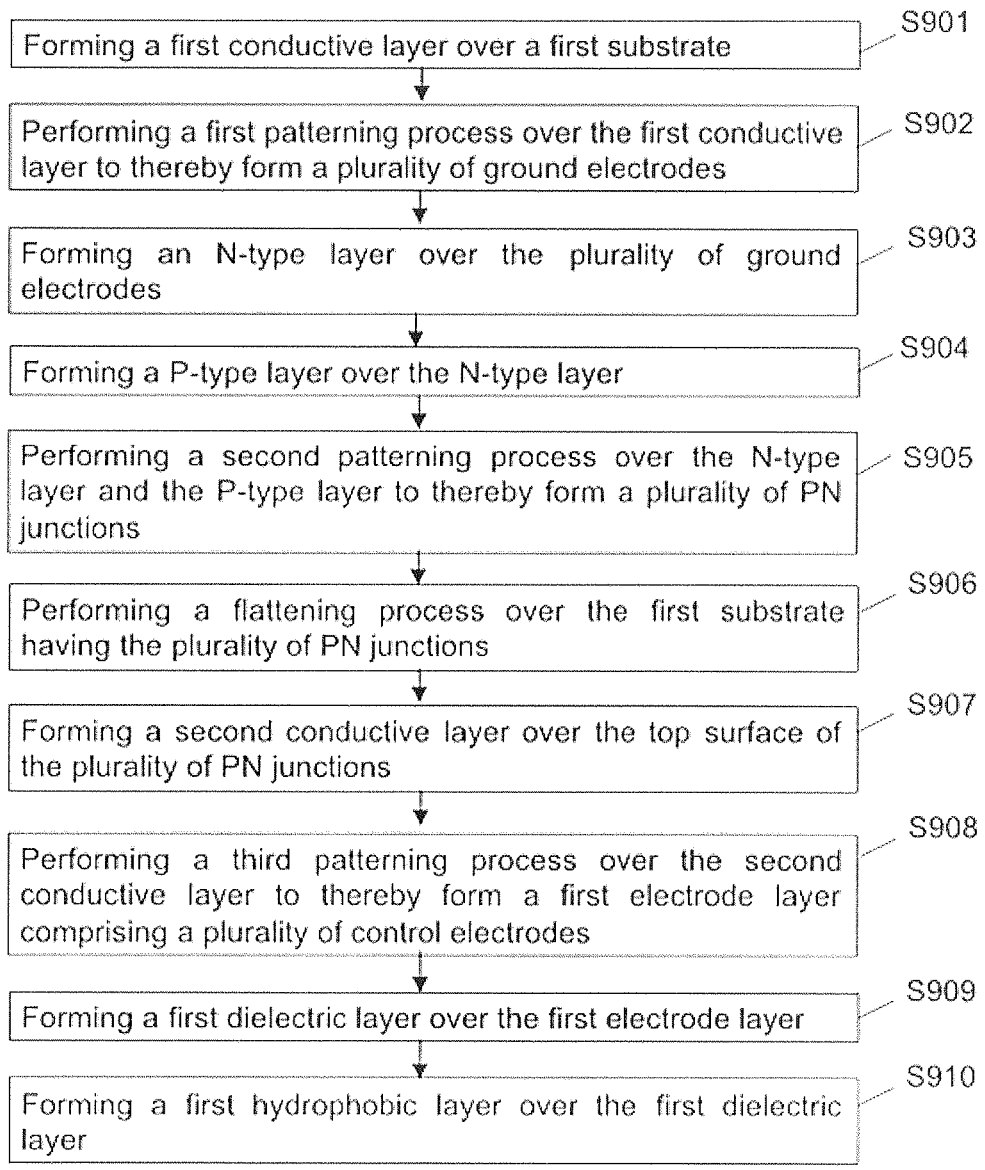
FIG. 9A illustrates a flow chart of a method for manufacturing a microfluidic substrate according to some other embodiments of the disclosure.

FIG. 9A illustrates a flow chart of a method for manufacturing a microfluidic substrate according to some other embodiments of the disclosure.

As shown in the FIG. 9A, the method specifically comprises the following steps as respectively set forth in S901-S910, and the intermediate products after performing each of the steps in the whole manufacturing process are respectively illustrated in FIGS. 10-19.

Figure 10:
FIGS. 10-19 respectively illustrate an intermediate product of a microfluidic substrate being manufactured after each of steps S901-S910 of the method illustrated in FIG. 9A.

S901: Forming a first conductive layer over a first substrate;

FIG. 10 illustrates an intermediate product of a microfluidic substrate being manufactured after step S901 where a first conductive layer 102 is formed over a first substrate 101.

Herein the first conductive layer can comprise a metal such as Al, Cu, Mo, Ti, Cr, etc., an alloy of any two of these above metals, or a transparent conductive material, such as a thin film of indium tin oxide (ITO) or indium zinc oxide (IZO), etc.

Figure 9B:
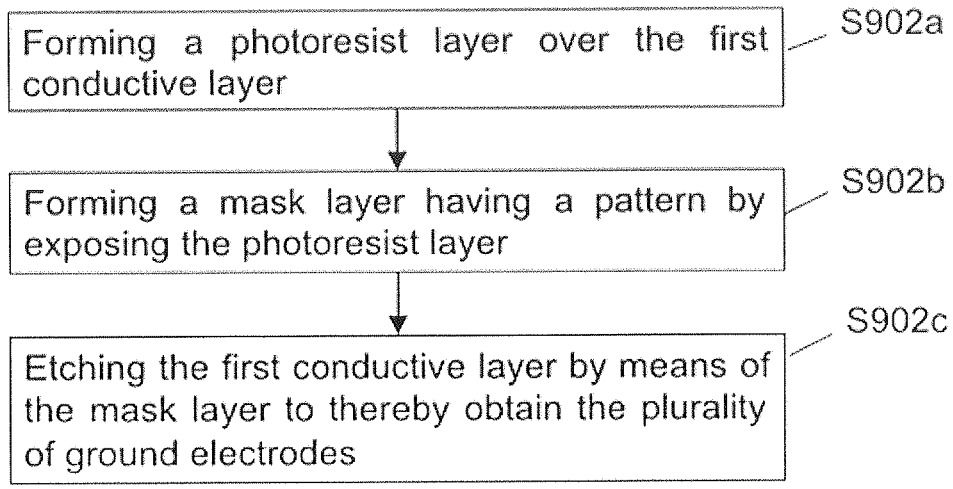
FIGS. 9B-9E respectively illustrate a flow chart of the step S902, S903, S904, and S906 of the method for manufacturing a microfluidic substrate as illustrated in FIG. 9A according to some embodiments of the disclosure.

S902: Performing a first patterning process over the first conductive layer to thereby form a plurality of ground electrodes;

Specifically, as illustrated in FIG. 9B, the step S902 can include the following sub-steps as respectively set forth in sub-steps S902a-S902c:

S902a: Forming a photoresist layer over the first conductive layer;

S902b: Forming a mask layer having a pattern by exposing the photoresist layer; and S902c: Etching the first conductive layer by means of the mask layer to thereby obtain the plurality of ground electrodes.

Figure 11:
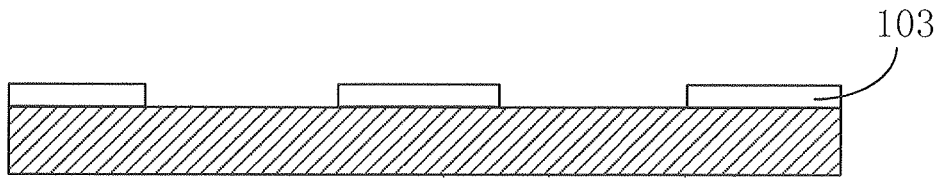

FIG. 11 illustrates an intermediate product of a microfluidic substrate being manufactured after step S902 where a plurality of ground electrodes 103 are formed by means of the first patterning process. Herein it is noted that a plurality of control pins, a plurality of temperature pins, and a plurality of lead lines (including a plurality of control lead lines, a plurality of temperature lead lines, or both) can also be formed at the same time during step S902.

Figure 9C:
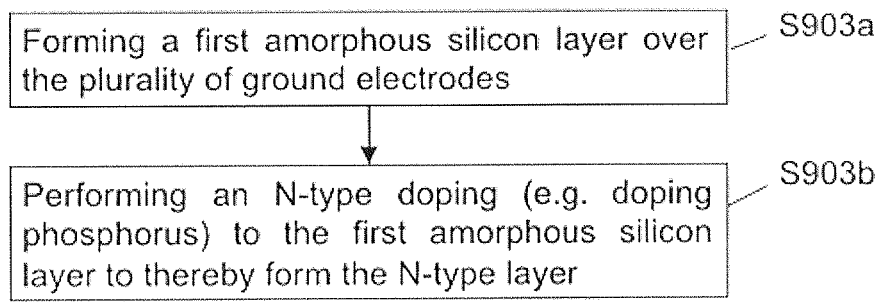

S903: Forming an N-type layer over the plurality of ground electrodes;

Specifically, as illustrated in FIG. 9C, the step S903 can comprise the following sub-steps S903a-S903b:

S903a: Forming a first amorphous silicon layer over the plurality of ground electrodes; and S903b: Performing an N-type doping (e.g. doping phosphorus) to the first amorphous silicon layer to thereby form the N-type layer.

Figure 12:
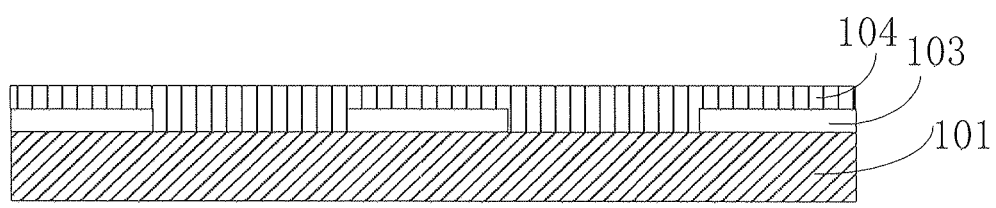

FIG. 12 illustrates an intermediate product of a microfluidic substrate being manufactured after step S903 where an N-type layer 104 is formed over the plurality of ground electrodes 103.

Figure 9D:
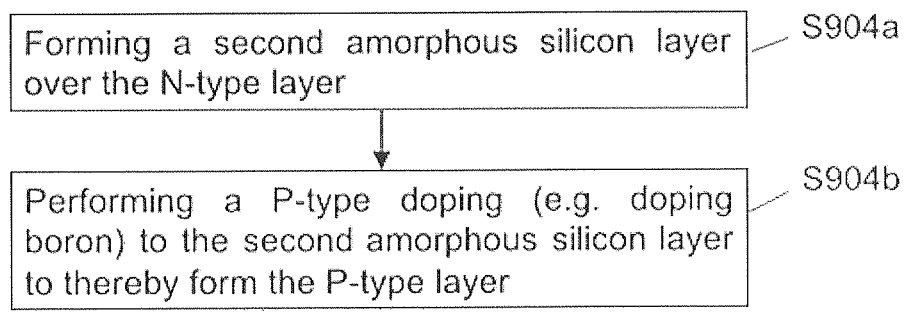

S904: Forming a P-type layer over the N-type layer;

Specifically, as illustrated in FIG. 9D, the step S904 can comprise the following sub-steps S904a-S904b:

S904a: Forming a second amorphous silicon layer over the N-type layer; and

S904b: Performing a P-type doping (e.g. doping boron) to the second amorphous silicon layer to thereby form the P-type layer.

Figure 13:
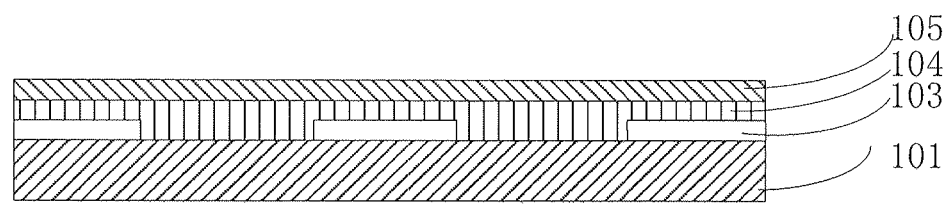

FIG. 13 illustrates an intermediate product of a microfluidic substrate being manufactured after step S904 where a P-type layer 105 is formed over the N-type layer 104.

Figure 14:
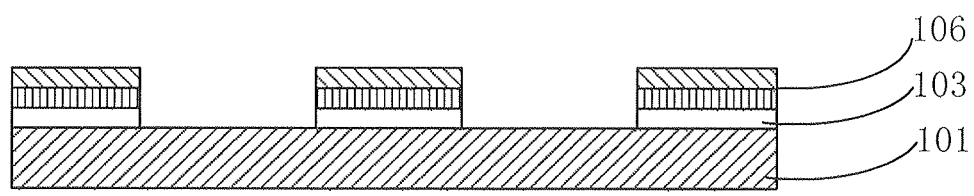

S905: Performing a second patterning process over the N-type layer and the P-type layer to thereby form a plurality of PN junctions;

FIG. 14 illustrates an intermediate product of a microfluidic substrate being manufactured after step S905 where a plurality of PN junctions 106 are formed on the plurality of ground electrodes 103 through the second patterning process over the N-type layer 104 and the P-type layer 105. A PN junction is formed on each ground electrode 103.

Figure 9E:
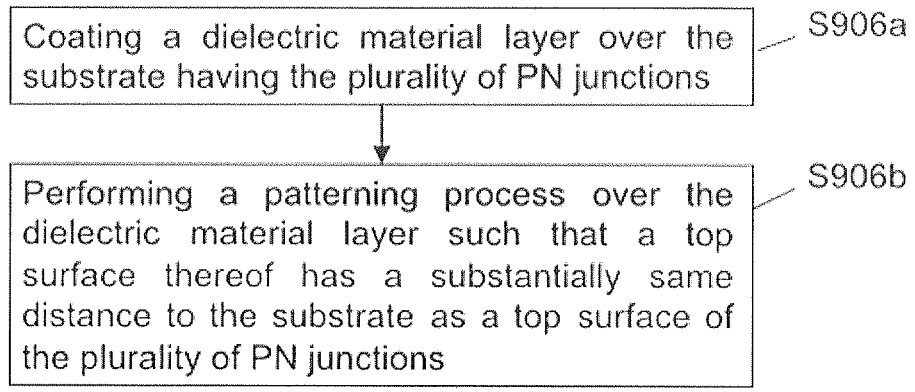

S906: Performing a flattening process over the first substrate having the plurality of PN junctions;

Specifically, as illustrated in FIG. 9E, the step S906 comprises:

S906a: Coating a dielectric material layer over the substrate having the plurality of PN junctions; and S906b: Performing a patterning process over the dielectric material layer such that a top surface thereof has a substantially same distance to the substrate as a top surface of the plurality of PN junctions.

Herein the dielectric material layer can comprise silicon oxide, silicon nitride, PDMS, or parylene, etc.

Figure 15:
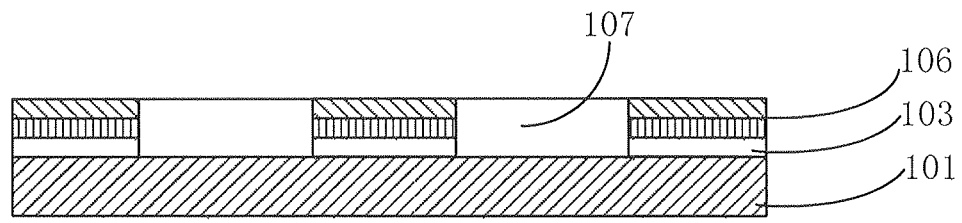

FIG. 15 illustrates an intermediate product of a microfluidic substrate being manufactured after step S906 where a flattening layer 107 is arranged between adjacent PN junctions 106 and a top surface thereof has a substantially same distance to the first substrate 101 as a top surface of the plurality of PN junctions 106. Optionally, vias can be formed in the flattening layer 107.

Figure 16:
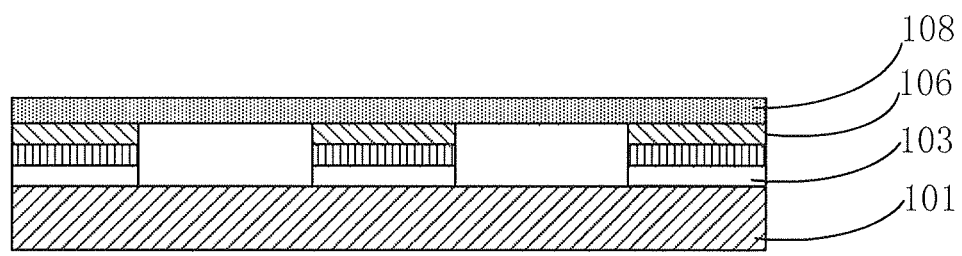

S907: Forming a second conductive layer over the plurality of PN junctions;

FIG. 16 illustrates an intermediate product of a microfluidic substrate being manufactured after step S907 where a second conductive layer 108 is formed on the first substrate that has undergone the flattening process, which is substantially disposed on the top surface of the flattening layer 107 and the plurality of PN junctions 106.

Figure 17:
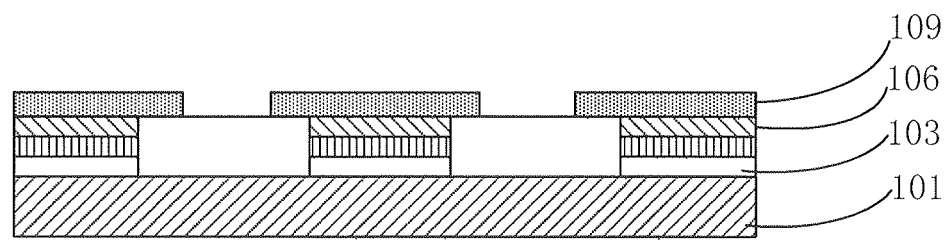

S908: Performing a third patterning process over the second conductive layer to thereby form a first electrode layer comprising a plurality of control electrodes;

FIG. 17 illustrates an intermediate product of a microfluidic substrate being manufactured after step S908 where the second conductive layer 108 is treated by a third patterning process to thereby form a first electrode layer having a plurality of control electrodes 109. In embodiments where the flattening layer 107 is provided with vias, it is configured such that each control electrode covers a via to thereby electrically connected with a control lead line.

S909: Forming a first dielectric layer over the first electrode layer.

Specifically, the step S909 can be realized through a deposition process. The first dielectric layer can comprise silicon oxide, silicon nitride, PDMS, or parylene, etc.

Figure 18:
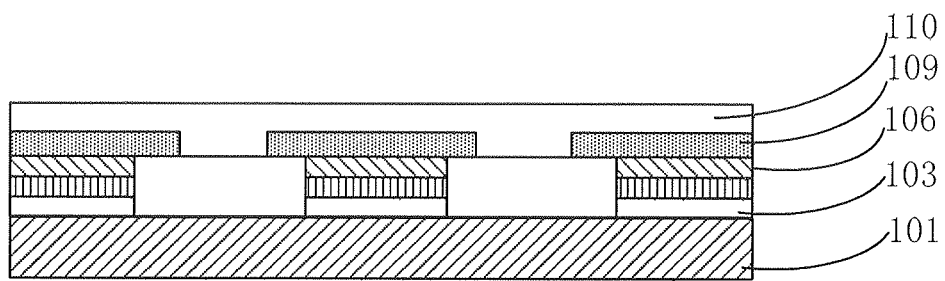

FIG. 18 illustrates an intermediate product of a microfluidic substrate being manufactured after step S909 where a first dielectric layer 110 is formed over the plurality of control electrodes 109.

S910: Forming a first hydrophobic layer over the first dielectric layer.

Specifically, the step S910 can be realized through a deposition process. The hydrophobic layer can comprise polytetrafluoroethylene, fluoroplastic, polymethyl methacrylate, or an organic polymer, etc.

Figure 19:
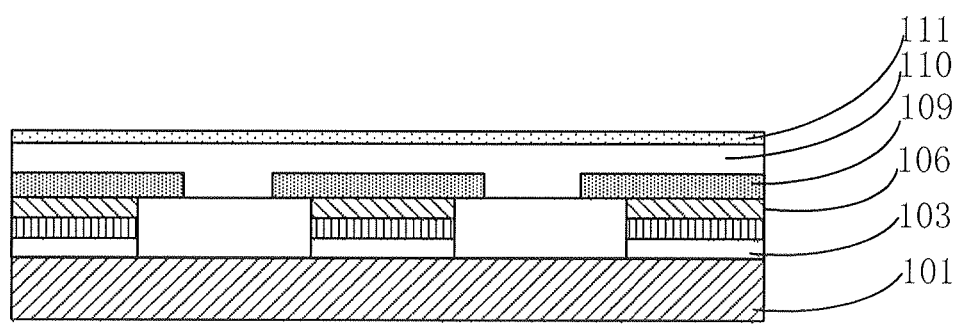

FIG. 19 illustrates an intermediate product of a microfluidic substrate being manufactured after step S910 where a first hydrophobic layer 111 is formed over the first dielectric layer 110.

Figure 9F:
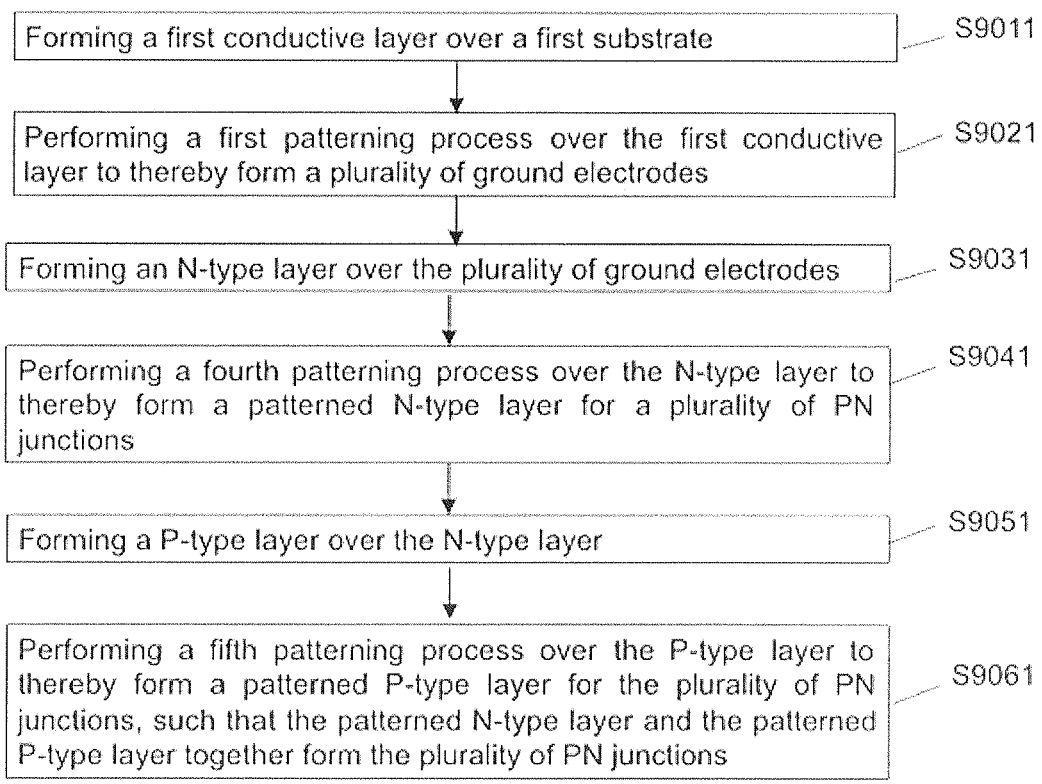
FIG. 9F illustrates a flow chart of the steps of another method prior to step S906 of the method for manufacturing a microfluidic substrate as illustrated in FIG. 9A according to some other embodiments of the disclosure.

According to another embodiment of a method for manufacturing a microfluidic substrate, the steps S901-S905 (whose intermediate products are respectively shown in FIGS. 10-14) in the embodiment as described above can be replaced with the following steps S9031, S9032, S9041, and S9042, as illustrated in FIG. 9F:

S9011: Forming a first conductive layer over a first substrate;

S9021: Performing a first patterning process over the first conductive layer to thereby form a plurality of ground electrodes;

S9031: Forming an N-type layer over the plurality of ground electrodes;

S9041: Performing a fourth patterning process over the N-type layer to thereby form a patterned N-type layer for a plurality of PN junctions;

S9051: Forming a P-type layer over the N-type layer;

S9061: Performing a fifth patterning process over the P-type layer to thereby form a patterned P-type layer for the plurality of PN junctions, such that the patterned N-type layer and the patterned P-type layer together form the plurality of PN junctions.

Figure 9G:
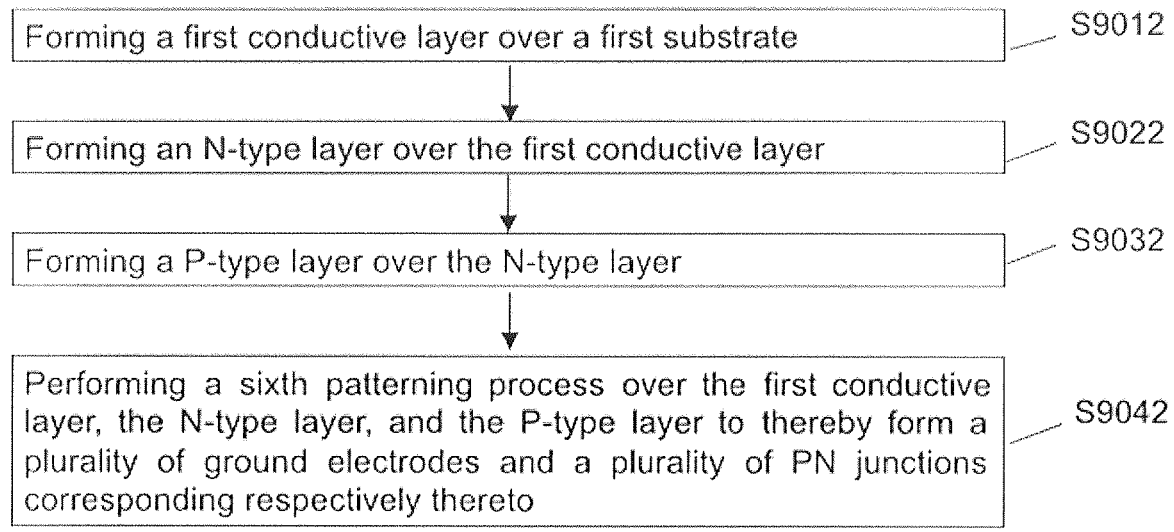
FIG. 9G illustrates a flow chart of the steps of yet another method prior to step S906 of the method for manufacturing a microfluidic substrate as illustrated in FIG. 9A according to yet other embodiments of the disclosure.

According to yet another embodiment of a method for manufacturing a microfluidic substrate, the steps S901-905 (whose intermediate products are shown in FIGS. 10-14) can be replaced with the following steps, as illustrated in FIG. 9G:

S9012: Forming a first conductive layer over a first substrate;

S9022: Forming an N-type layer over the first conductive layer;

S9032: Forming a P-type layer over the N-type layer; and

S9042: Performing a sixth patterning process over the first conductive layer, the N-type layer, and the P-type layer to thereby form a plurality of ground electrodes and a plurality of PN junctions corresponding respectively thereto.

In a fourth aspect, the disclosure further provides a control method of a microfluidic chip. Herein the microfluidic chip can be a microfluidic chip according to any one the embodiments as described above, and can include an upper substrate and a microfluidic substrate. The microfluidic substrate comprises a droplet driving assembly comprising a plurality of control electrodes, and a temperature detection assembly comprising at least one temperature sensor. The at least one temperature sensor positionally corresponds to the plurality of control electrodes.

The method substantially comprises an operational phase, which further includes:

a droplet driving stage, comprising: providing a first voltage signal to one of the plurality of control electrodes to drive the droplet to move along the predetermined path between the upper substrate and the microfluidic substrate; and a temperature detection stage, comprising: providing a second voltage to one of the at least one temperature sensor to detect a temperature at a position associated with one of the plurality of control electrodes corresponding to the one of the at least one temperature sensor.

As such, the droplet driving stage substantially comprises turning on one of the plurality of driving units by providing the first voltage signal, and the temperature detection stage comprises turning on the one of the at least one temperature sensor at a position associated with one of the plurality of control electrodes corresponding to the one of the at least one temperature sensor by providing the second voltage signal.

Figure 20:
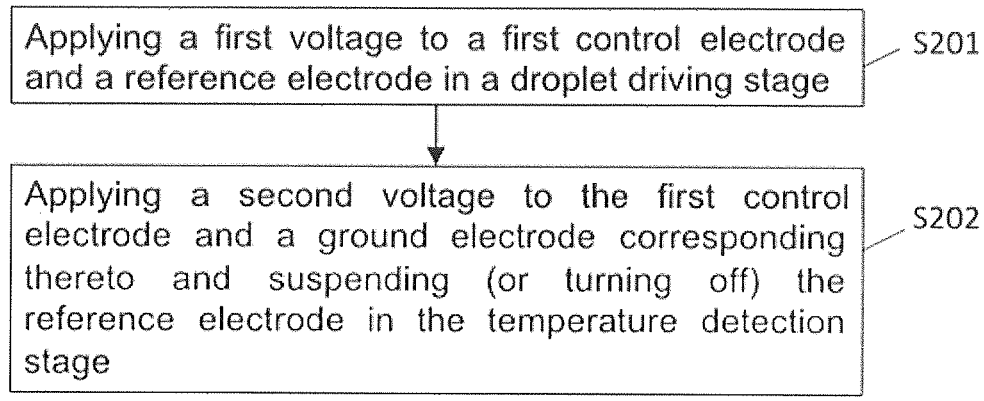
FIG. 20 is a flow chart of a control method of a microfluidic chip according to some embodiments of the disclosure.

FIG. 20 is a flow chart of a control method of a microfluidic chip according to some specific embodiments of the disclosure, which is suitable for the microfluidic chips as illustrated in FIG. 5 and FIG. 6A. As shown in FIG. 20, the control method comprises:

S201: Applying a first voltage to a first control electrode and a reference electrode in a droplet driving stage.

Herein, the first control electrode is one of the plurality of control electrodes in the first electrode layer in the microfluidic substrate of the microfluidic chip, and can be determined among the plurality of control electrodes based on a position, and a pre-determined moving path, of a present droplet.

S202: Applying a second voltage to the first control electrode and a ground electrode corresponding thereto and suspending (or turning off) the reference electrode in the temperature detection stage.

Figure 21:
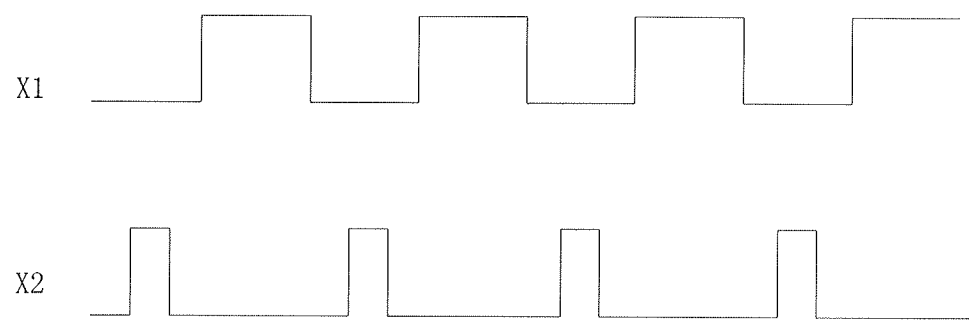
FIG. 21 is a time-series chart of the driving signals for a microfluidic chip driving method according to some embodiments of the present disclosure.

FIG. 21 is a time-series chart of driving signals for a microfluidic method according to some embodiments of the present disclosure.

Specifically, as shown in FIG. 21, a square waveform signal X1 is used as a droplet driving voltage signal, and a square waveform signal X2 is used as a temperature detection driving voltage signal. Detection of temperature is carried out when the square waveform signal X1 (i.e. the droplet driving voltage signal) is at a low level, and driving of droplets is carried out when the square waveform signal X1 (i.e. the droplet driving signal) is at a high level. In an illustrating example, the frequency of the droplet driving voltage signal is approximately in a range of 0.1-10 Hz, and the frequency of the temperature detection driving voltage signal is no higher than the frequency of the droplet driving voltage signal.

Figure 22A:
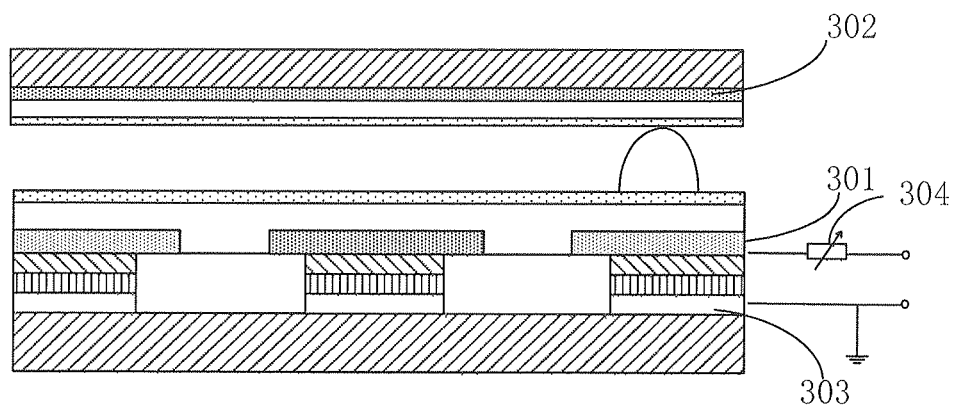
FIGS. 22A and 22B respectively illustrate a microfluidic chip at a temperature detection step and at a droplet driving step, respectively, in the microfluidic chip driving method according to some embodiments of the present disclosure.
Figure 22B:
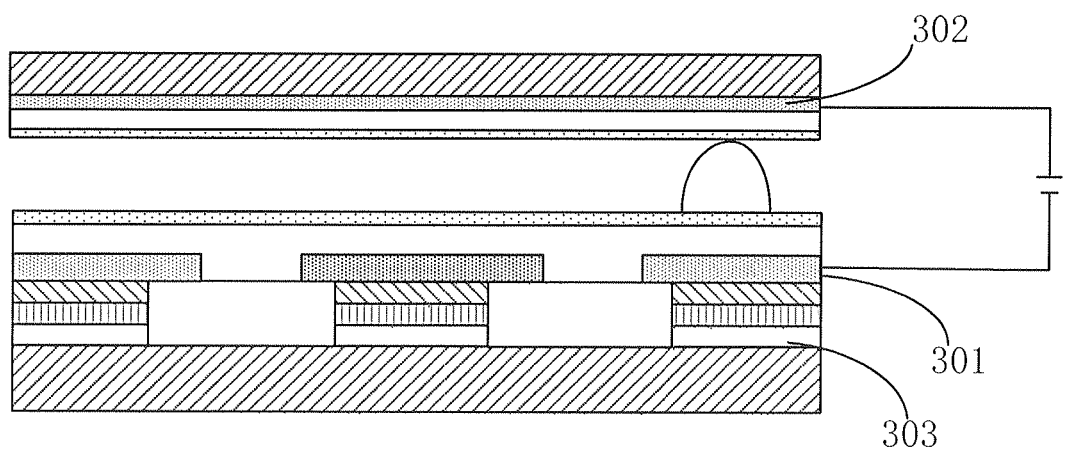

FIG. 22A and FIG. 22B respectively illustrate the microfluidic chip respectively at a temperature detection step and at a droplet driving step in the microfluidic chip driving method according to some embodiments of the present disclosure;

When the square waveform signal X1 is at a low level, as shown in FIG. 22A, a voltage is applied to the first control electrode 301, and a ground electrode 303 corresponding thereto and the reference electrode 302 is suspended or turned off.

Because the working principle for a PN junction-type temperature sensor is that the voltage of the PN junction has a linear relationship with a temperature within a certain temperature range when a current is maintained unchanged. As such, during implementation, a variable resistor 304 can be connected in series in a circuit of a first control electrode 301 and a ground electrode 303 corresponding to the first control electrode 301.

By adjusting the variable resistor 304 to thereby maintain a current in the circuit having the first control electrode 301 and the ground electrode 303 corresponding thereto substantially constant or unchanged, a temperature at a region corresponding to the first control electrode 301 can be determined by detecting a voltage (Vtemp) between the first control electrode 301 and the ground electrode 303 corresponding thereto.

When the square waveform signal X1 is at a high level, as shown in FIG. 22B, a voltage is applied to a first control electrode 301 and a reference electrode 302, and a ground electrode 303 is suspended. As such, in the droplet driving stage, the droplet can be controlled to move by altering a sequence of charging of the control electrodes. Specifically, depending on the predetermined moving path of the droplet, the corresponding control electrodes can be charged in sequence.

Figure 23:
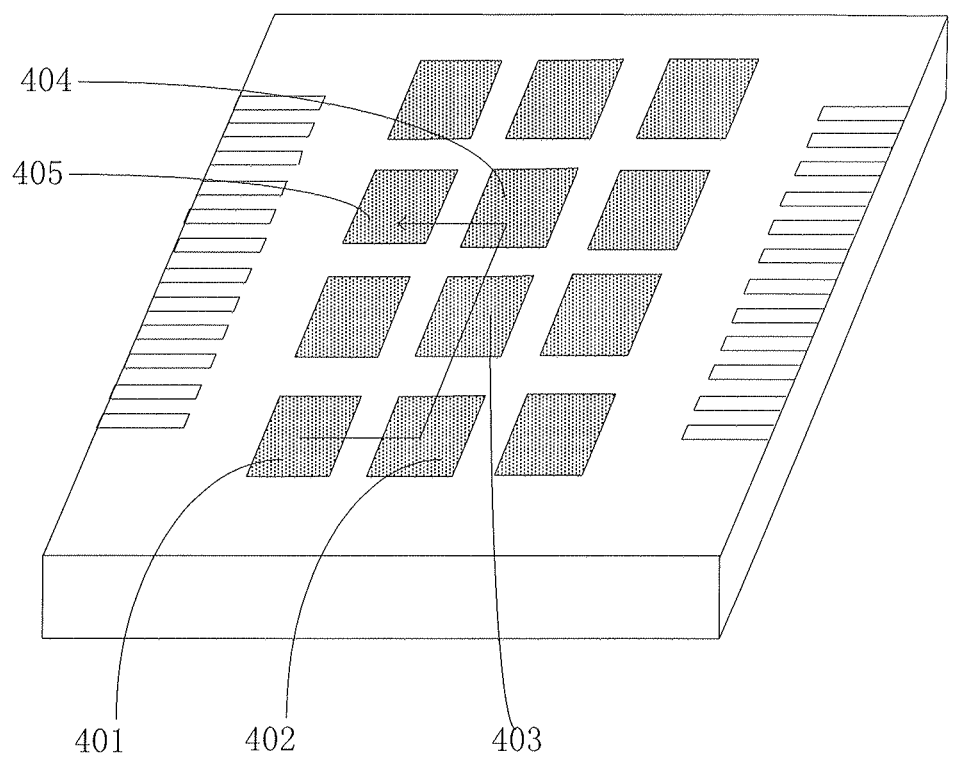
FIG. 23 illustrates a sequence of control over a droplet moving along a predetermined path in a microfluidic chip according to some embodiments of the present disclosure.

FIG. 23 is a schematic diagram illustrates a sequence for controlling a droplet to move according to some embodiments of the disclosure. As shown in FIG. 24, a droplet at a region corresponding to the control electrode 401 is controlled to move along a path as indicated by the arrow shown in FIG. 23 to reach a region corresponding to the control electrode 405.

As such, the charging sequence of the control electrodes comprises: a voltage is sequentially applied to the control electrode 402, the control electrode 403, and the control electrode 404. Finally, a voltage is applied to the control electrode 405 to thereby allow the droplet to move along the pre-determined path to arrive at the destination, that is, a region corresponding to the control electrode 405.

This embodiment of the method can realize a switch between a droplet driving process and a temperature detection process by means of a control over an external circuit. As for certain biochemical reactions that are sensitive to temperature changes, the temperature can be detected in a real-time manner, and further by means of an external means to provide temperature control, these reactions can be ensured to proceed smoothly.

Optionally, the control method can further comprise a temperature adjusting phase, which includes the following sub-steps:

S301: stop providing the first voltage to any one of the plurality of control electrodes if the one of the at least one temperature sensor detects that a temperature at the position is not within a pre-determined range; and S302: adjusting the temperature at the position until the one of the at least one temperature sensor detects that the temperature at the position is within the pre-determined range; and S303: resuming providing the first voltage signal to the one of the plurality of control electrodes.

The method can realize the effect that the temperature sensor detects if a temperature at a position is within a pre-determined range, and the operational phase is paused if a temperature at a position is not within the pre-determined range. After an adjustment of the temperature, by means of, for example, a temperature adjusting module, if the temperature is within the pre-determined range, the operational phase can be resumed. As such, an optimal reaction temperature can be ensured for a maximum reaction efficiency.

Herein the temperature adjusting module can be a movable heating resistance, which can, upon detecting that if a temperature at a particular position is not within the pre-determined range, move to the position to thereby adjust the temperature at the position to be within the pre-determined range.

It is noted that in some embodiments of the microfluidic chip, the plurality of control electrodes in the microfluidic substrate and the reference electrode in the upper substrate substantially form a plurality of driving units, which are configured to drive a droplet to move at each position along a predetermined path between the upper substrate and the microfluidic substrate. The at least one temperature sensor in the microfluidic substrate can be configured to positionally correspond to the plurality of driving units. Each of the at least one temperature sensor is configured to detect whether a temperature of the droplet at a position is within a range that corresponds to the position.

It is noted that the range of the temperature corresponding to each position of the microfluidic chip can be programmed, which can be substantially same at each position, but can also be different at each position (i.e. the range of temperature for each position can be individually programmed).

When the droplet moves to one particular position under driving by the operational phase, a temperature of the droplet will be detected by one temperature sensor corresponding to the particular position. If the temperature of the droplet is within the range that has been specifically programmed for that particular position, the droplet is allowed to move to a next position; otherwise, the operational phase can be paused to allow the temperature of the droplet to be adjusted until it is within the range, then the droplet is allowed to move to the next position.

Although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the exemplary embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A microfluidic substrate, comprising:
   a first substrate;
   a droplet driving assembly over the first substrate, comprising a first electrode layer having a plurality of control electrodes, each configured as part of a driving unit to drive a droplet to move along a predetermined path over the microfluidic substrate; and a temperature detection assembly, comprising at least one temperature sensor;

wherein:
the at least one temperature sensor positionally corresponds to the plurality of control electrodes such that each of the at least one temperature sensor detects a temperature at a position associated with one of the plurality of control electrodes corresponding to the each of the at least one temperature sensor;

each of the at least one temperature sensor at least partially overlaps with one of the plurality of control electrodes corresponding to the each of at least one temperature sensor when viewed from a vertical direction of the first substrate;

each of the at least one temperature sensor comprises a PN junction and two electrodes, disposed over the first substrate; and the PN junction is disposed between the two electrodes.

2. The microfluidic substrate of claim 1, wherein the temperature detection assembly and the droplet driving assembly are respectively arranged over two opposing sides of the first substrate.

3. The microfluidic substrate of claim 1, wherein the temperature detection assembly and the droplet driving assembly are arranged over a same side of the first substrate.

4. The microfluidic substrate of claim 3, wherein the temperature detection assembly is arranged between the droplet driving assembly and the first substrate.

5. The microfluidic substrate of claim 4, wherein one of the two electrodes in the each of the at least one temperature sensor forms an integrated structure with the one of the plurality of control electrodes corresponding to the each of at least one temperature sensor.

6. The microfluidic substrate of claim 5, wherein the droplet driving assembly further comprises a first dielectric layer and a first hydrophobic layer, sequentially disposed over the plurality of control electrodes.

7. The microfluidic substrate of claim 5, wherein the one of the plurality of control electrodes corresponding to the each of at least one temperature sensor comprises a portion outside the each of the at least one temperature sensor when viewed from the vertical direction of the first substrate, wherein:

a via is arranged below the portion of the one of the plurality of control electrodes and above the first substrate, and is configured to allow an electric connection between the one of the plurality of control electrodes and a control lead line.

8. The microfluidic substrate of claim 7, wherein the control lead line is arranged at a substantially same layer as another of the two electrodes of the each of the at least one temperature sensor.

9. The microfluidic substrate of claim 1, wherein the at least one temperature sensor positionally corresponds to the plurality of control electrodes in a one-to-one relationship.

10. The microfluidic substrate of claim 1, wherein a number of the at least one temperature sensor is smaller than a number of the plurality of control electrodes.

11. A microfluidic chip, comprising:
an upper substrate, provided with at least one reagent inlet; and
the microfluidic substrate according to claim 1;
wherein:
the upper substrate and the microfluidic substrate are attached to one another in a leak-proof manner to thereby allow the droplet to move therebetween.

12. The microfluidic chip of claim 11, wherein the upper substrate comprises a second substrate, a reference electrode, a second dielectric layer, and a second hydrophobic layer; wherein:
the second hydrophobic layer, the second dielectric layer, the reference electrode, and the second substrate are sequentially disposed over a side of the first hydrophobic layer in the microfluidic substrate; and
the second hydrophobic layer and a first hydrophobic layer of the droplet driving assembly of the microfluidic substrate in the microfluidic substrate form a flowing space for the droplet.

13. The microfluidic chip of claim 12, further comprising a variable resistor, wherein the variable resistor is electrically coupled to, and is configured to maintain a substantially constant current through, each of the at least one temperature sensor.

14. The microfluidic chip of claim 12, further comprising a signal magnification circuit, wherein the signal magnification circuit is electrically coupled to, and is configured to magnify a signal detected by each of the at least one temperature sensor.

15. A method of controlling the microfluidic chip of claim 11, the method comprising:
providing a first voltage signal to one of the plurality of control electrodes to drive the droplet to move along the predetermined path between the upper substrate and the microfluidic substrate; and
providing a second voltage signal to one of the at least one temperature sensor to detect a temperature at a position associated with one of the plurality of control electrodes corresponding to the one of the at least one temperature sensor.

16. The method of claim 15, further comprising:
stop providing the first voltage signal to any one of the plurality of control electrodes if the one of the at least one temperature sensor detects that a temperature at the position is not within a pre-determined range; and
adjusting the temperature at the position until the one of the at least one temperature sensor detects that the temperature at the position is within the pre-determined range; and
resuming providing the first voltage signal to the one of the plurality of control electrodes.

17. The method of claim 15, wherein each of the first voltage signal and the second voltage signal is a square waveform signal.

18. The method of claim 17, wherein the second voltage signal is configured to have a frequency no higher than a frequency of the first voltage signal.

* * * * *